United States Patent [19]

Ernst

[11] 4,160,328

[45] Jul. 10, 1979

[54] SEGMENTED LONGITUDINAL MEASURING DEVICE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 911,940

[22] Filed: Jun. 2, 1978

[30] Foreign Application Priority Data

Jun. 21, 1977 [DE] Fed. Rep. of Germany ....... 2727769

[51] Int. Cl.² ............................................ G01B 11/04
[52] U.S. Cl. ............................ 33/125 R; 33/125 C; 356/383
[58] Field of Search ............................... 356/169, 170; 250/237 C; 33/125 R, 125 A, 125 C, 125 T, 105, 107, 111, 161, 1 L

[56] References Cited

U.S. PATENT DOCUMENTS

| | | | |
|---|---|---|---|
| 2,795,992 | 6/1957 | Tao | 33/125 C |
| 3,108,378 | 10/1963 | Räntsch | 33/1 L |
| 3,622,411 | 11/1971 | Koshiishi | 356/169 |
| 3,816,022 | 6/1974 | Wieg | 33/125 C |
| 4,060,903 | 12/1977 | Ernst | 33/125 R |

FOREIGN PATENT DOCUMENTS

| | | | |
|---|---|---|---|
| 586890 | 4/1947 | United Kingdom | 33/107 R |
| 954343 | 11/1962 | United Kingdom | 33/125 R |
| 1050061 | 12/1966 | United Kingdom | 33/125 T |
| 1192513 | 5/1970 | United Kingdom | 33/125 C |

*Primary Examiner*—Richard E. Aegerter
*Assistant Examiner*—John W. Shepperd
*Attorney, Agent, or Firm*—Hume, Clement, Brinks, Willian & Olds, Ltd.

[57] ABSTRACT

A segmented longitudinal measuring device is disclosed which includes a plurality of hollow tubular housing segments. Inside each housing segment is mounted an intermediate support member which in turn serves as a mounting surface for a measuring scale segment. Thus, each segment forms a complete modular unit containing a length of measuring scale, intermediate support member, and housing. Generally the coefficient of thermal expansion of the support members is matched to that of the scale segments, and the support members are mounted on the housing segments in a longitudinally displaceable manner, as by a layer of resilient elastomeric material, for example. The measuring device also includes means for compressing the support members together, end to end, to form a continuous structure extending along the measuring direction. Adjustable contact members are provided between adjacent support members for precise adjustment of the separation between adjacent support members.

11 Claims, 8 Drawing Figures

SEGMENTED LONGITUDINAL MEASURING DEVICE

BACKGROUND OF THE INVENTION

This invention relates in general to an improved encapsulated measuring device for large measuring lengths built up from a plurality of segments, and more particularly to such a measuring device comprising a protective housing and a scale with differing expansion coefficients, and a scanning unit.

In encapsulated longitudinal measuring systems the measuring scale is often subject to deformation caused by differential thermal expansion between the housing and the scale in response to temperature changes. For cost reasons, the housing generally is produced from aluminum. On the other hand, the scale generally is made of glass or a steel tape, and both glass and steel have expansion coefficients which greatly differ from that of the aluminum housing. In the measuring systems of the prior art the measuring scale is, therefore, often mounted to the housing by a resilient intermediate layer. The resilient intermediate layer reduces the transmission of distorting forces to the scale in the event of differential longitudinal expansion between the scale and the housing due to temperature fluctuations.

However, for reasons of production engineering it has heretofore been deemed impossible to manufacture the scale and the housing in self-contained segments of any desired length. Until now, a measuring device built up of several separate segments has been regarded as impractical due to unacceptably large errors produced at the junction between adjacent segments.

SUMMARY OF THE INVENTION

The present invention is directed to an improved, segmented measuring device which is adapted for use with large measuring lengths. The measuring device of this invention includes a housing and a scale which are segmented into a plurality of partial units. The individual segments of the scale are fixed on individual segments of an intermediate support member having an expansion coefficient substantially equivalent to that of the scale. The segments of the intermediate support member are connected to the segments of the housing in a longitudinally displaceable manner, preferably via a resilient elastomeric intermediate layer, and end means are provided for pressing several complete segments arranged end to end in a precise and adjustable manner against each other.

One advantage of the invention resides in the fact that measuring devices having a wide range of lengths can be built up from only a few types of segments. Individual segments are adjustable at the junction between adjacent segments, so that the user can assemble any desired number of partial lengths.

The invention, together with further objects and attendant advantages, will be best understood by reference to the following description taken in connection with the accompanying drawings.

BRIEF DESCRIPTION OF THE INVENTION

DETAILED DESCRIPTION OF PREFERRED EMBODIMENTS

Figure 1:
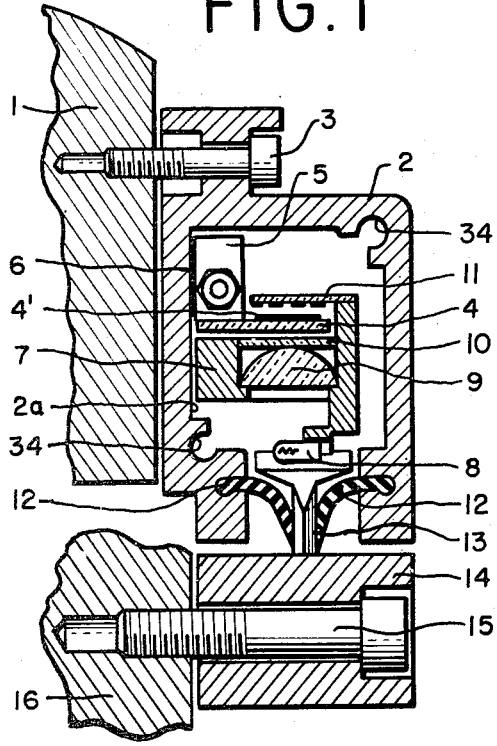
FIG. 1 is a cross-sectional view of a preferred embodiment of the longitudinal measuring device of this invention.

Referring now to the drawings, FIG. 1 shows a photoelectrical longitudinal measuring device in a schematic representation. A housing 2 is fastened to a bed 1 with screws 3. A scale 4 consisting of a glass ruler is located inside the housing 2, and is fixed to an intermediate support member 5. The intermediate support member 5 is resiliently mounted via an elastomeric layer 6 to an inner surface 2a of the housing 2. A scanning unit 7 with lamp 8, condenser lens 9, graduated plate 10 and photosensor elements 11 scans the graduation 4' of the scale 4. The housing 2 is sealed by sealing lips 12. A blade-like coupling means 13 extends through these sealing lips 12 and connects the scanning unit 7 to an external mounting leg 14. The mounting leg 14 is fastened to a carriage 16 of a machine tool. Movement of the carriage 16 is transmitted via the mounting leg 14 and the coupling means 13 to the scanning unit 7, which is thereby moved in the measuring direction along the scale 4.

Figure 2:
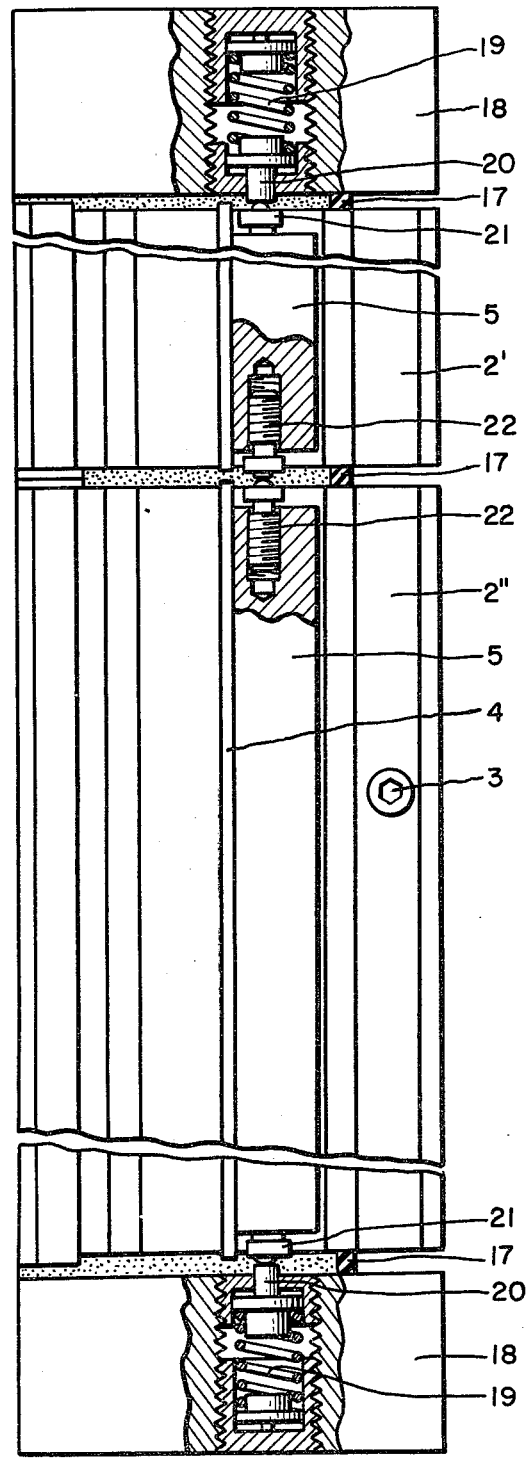
FIG. 2 is a longitudinal view in partial cutaway of the measuring device of FIG. 1.

A longitudinal view of this longitudinal measuring device is shown in FIG. 2 in partial cutaway. Here, neither the bed 1 nor the carriage 16 of the machine tool is shown. The scanning unit is not shown either because only the elements necessary for the comprehension of the invention are depicted. Several segments 2' and 2" of the housing 2 are connected to each other and provided at the junction points with resilient seals 17. The seals 17 must be sufficiently resilient so as not to impede the differential thermal expansion of the machine tool, the aluminum housing 2, and the intermediate support member 5; on the other hand, they must assure a complete sealing at the junction point. Pressure springs 19 are placed in end members 18. These springs 19 press via punches 20 against contact surfaces 21 which are located in the end sections of the segments of the intermediate support member 5. The segments of the intermediate support member moreover are provided with adjustment screws 22 at adjacent ends and are pressed against each other end to end by the pressure springs 19, so that they abut against each other over a wide temperature range without play.

Figure 3:
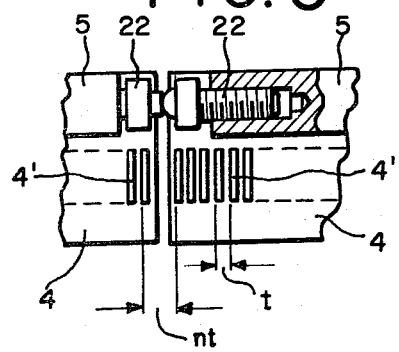
FIG. 3 is an enlarged view in partial cutaway of the adjusting system of the device of FIG. 1.

FIG. 3 more clearly shows a set of adjustment screws 22. The scale 4 is so mounted on the segments of the intermediate support member 5 that the scale protrudes beyond the end of the intermediate support member 5. Alongside the intermediate support member 5 the graduation 4' is plotted on the scale 4. Threaded holes are cut into the end sections of the segments of the intermediate support member 5 and these holes are provided with adjustment screws 22. It is possible to adjust the spacing of the terminal lines of the graduation 4' with the aid of the adjustment screws 22 in the intermediate support member 5 in such a manner that the distance amounts to an integer multiple n of the graduation period t. In this way measuring and reading errors at the junction point can be avoided.

Figure 4:
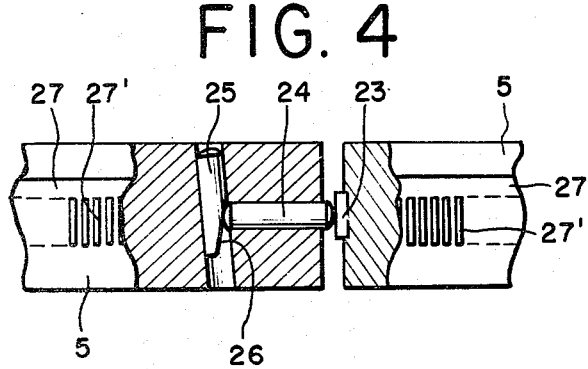
FIG. 4 is an enlarged view in partial cutaway of a first alternate adjusting system.

An alternative adjustment system is represented in FIG. 4. A contact surface 23 is placed in one end section of the intermediate support member 5. The adjacent end section bears the adjustment system comprising a pin 24 and adjustment pin 25 provided with a wedge-shaped ramp 26 which contacts the first pin 24. As a result of the tapered wedge section of the adjustment pin 25 the spacing of the terminal graduation lines of a graduation 27' can be set so that the desired separation, $n \times t$, results, with n again being a small integer and t representing the graduation spacings. In this embodiment the scale consists of a steel tape 27 upon which the graduation 27' is applied. The invention is of course applicable also in measuring devices which measure light reflected from rather than transmitted through the scale.

Figure 5:
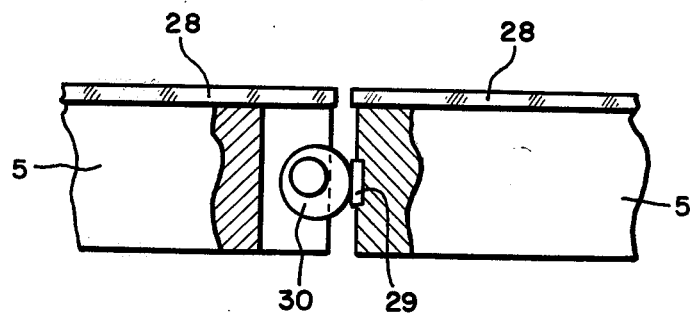
FIG. 5 is an enlarged view in partial cutaway of a second alternate adjusting system.

FIG. 5 represents a second alternative adjustment system. Here the scale is a glass rule 28 provided with a graduation in a manner known from prior art. A contact surface 29 in the end section of the intermediate support member 5 and an eccentric 30 in the end section of the adjacent segment of the intermediate support 5 coact. Here, also, the desired spacing distance, $n \times t$, can be established by adjustment of the eccentric 30. Of course, the three cited embodiments do not exhaust all possibilities for the adjustment of the scale position, and the scope of the invention encompasses other position adjusting means as well.

Figure 6:
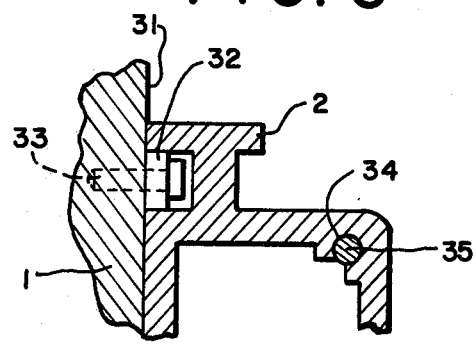
FIG. 6 is a partial cross-sectional view of the housing of FIG. 1.

A partial sectional view of the housing 2 is shown in FIG. 6. In order to achieve satisfactory measurement readings, the individual segments of the measuring device must be aligned in the measuring direction. This is accomplished by mounting the segments to a substantially continuous planar fastening surface 31. The housing 2 is secured to the mounting surface 31 by screws 3 (not shown). A guide rod 32 is also mounted on the guide surface 31, and is used for adjusting the position of the housing 2. The guide rod 32 is fastened by means of screws 33 to a portion of the machine tool 1. Alternately, it is possible to provide perforations 34 in the housing 2, so that the individual segments of the measuring device are held in alignment by pins 35 which are placed into the perforations 34.

Figure 7:
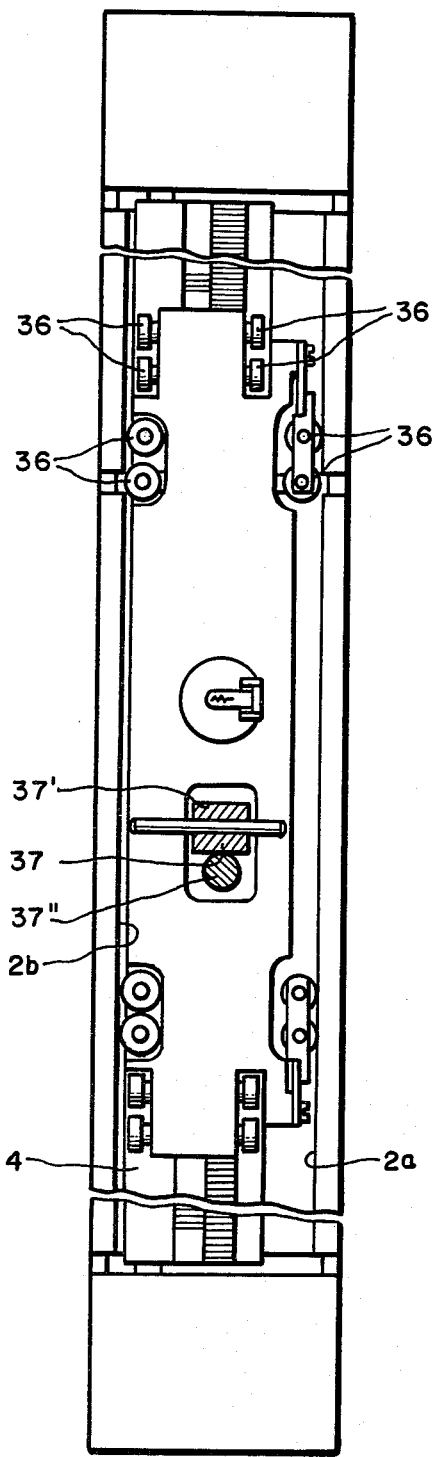
FIG. 7 is an interior view of the device of FIG. 1 with the scanning unit shown schematically.

The schematic inner view in FIG. 7 shows the housing 2 from the inside. The scanning unit 7 has guide rollers 36 which are arranged like tandem bearings in pairs with one roller positioned in front of the other. This arrangement assures that the scanning unit 7 can pass the gap at the junction between adjacent housing segments without undue transverse motion, for one of the guide rollers 36 always is in contact with a guidance surface 2a and 2b. In this preferred embodiment the scanning unit 7 is also guided at the scale 4. The scanning unit 7 is connected via a clutch 37 with the coupling means 3, not shown in this figure. The clutch 37 is here represented by two cylinders 37' and 37".

Figure 8:
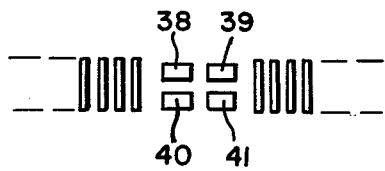
FIG. 8 is a schematic representation of the preferred position of the photosensors in the device of FIG. 1.

The schematic diagram of the position of the photosensor elements in FIG. 8 shows large surface photosensor elements 38, 39, 40 and 41 which are so arranged and interconnected that at the junction of two scale segments 4 the electrical signals obtained are subjected to minimal fluctuations.

Of course, it should be understood that various changes and modifications to the preferred embodiments described herein will be apparent to those skilled in the art. For example, the invention can be utilized in nonphoto-electric measuring devices such as optical measuring devices. Such changes and modifications can be made without departing from the spirit and scope of the present invention, and without diminishing its attendant advantages. It is, therefore, intended that such changes and modifications be covered by the following claims.

I claim:

1. A segmented longitudinal measuring device comprising:
    a plurality of housing segments arranged to form an enclosure;
    a plurality of intermediate support members, with means for securing each support member to the interior of one of the housing segments in a longitudinally displaceable manner;
    a plurality of measuring scale segments having thermal expansion coefficients substantially equal to the coefficient of thermal expansion of the support members, each scale segment secured to one of the support members;
    means for compressing said support members against each other end to end in an adjustable manner.

2. The longitudinal measuring device of claim 1 wherein the compressing means is formed by at least one spring which is arranged at one end of the measuring device.

3. The longitudinal measuring device of claim 2, wherein at least one spring is arranged at each end of the measuring device.

4. The longitudinal measuring device of claim 1 wherein each intermediate support member is provided with an adjustment member at one end.

5. The longitudinal measuring device of claim 4, wherein the adjustment members include screws.

6. The longitudinal measuring device of claim 1, wherein means are provided to place the housing segments in precise alignment in the measuring direction.

7. The longitudinal measuring device of claim 6, wherein alignment of the housing segments in one dimension is accomplished by a continuous planar fastening surface and in a second dimension by a guide rod.

8. The longitudinal measuring device of claim 6, wherein the alignment of the housing segments in one dimension is accomplished by a continuous planar fastening surface and in a second dimension by the coacting of pins and perforations in the end sections of the housing segments.

9. The longitudinal measuring device of claim 1 wherein the junctions between adjacent housing segments are sealed by seals which do not substantially restrict the differential expansion of the housing segments or the intermediate support members.

10. The longitudinal measuring device of claim 1 further including a scanning unit which is guided along the interior of the housing segments by guide rollers which are arranged in pairs oriented back to back.

11. A segmented longitudinal measuring device comprising:
    a plurality of hollow, tubular housing segments arranged end to end;
    at least one resilient seal, one seal placed between each pair of adjacent housing segments to seal the interior of the housing segments while permitting thermal expansion between adjacent housing segments;
    a plurality of intermediate support members each support member including a contact surface mounted at each end of the support member, said support members arranged end to end within the housing segments with adjacent contact surfaces in contact, one of said support members mounted in each housing segment in a longitudinally displaceable manner by a layer of elastomeric material.

a plurality of measuring scale segments arranged end to end within the housing segments, each of said scale segments mounted to one of said support members;

end members positioned adjacent each end of the measuring device adapted to provide a compressive force to the outermost contact surfaces of the outermost support members, whereby the support members are compressed together, end to end, and adjacent contact surfaces are maintained in contact;

means for adjusting the position of at least one of the contact surfaces, whereby the separation between at least one pair of adjacent scale segments may be varied.

* * * * *